Figure 3:
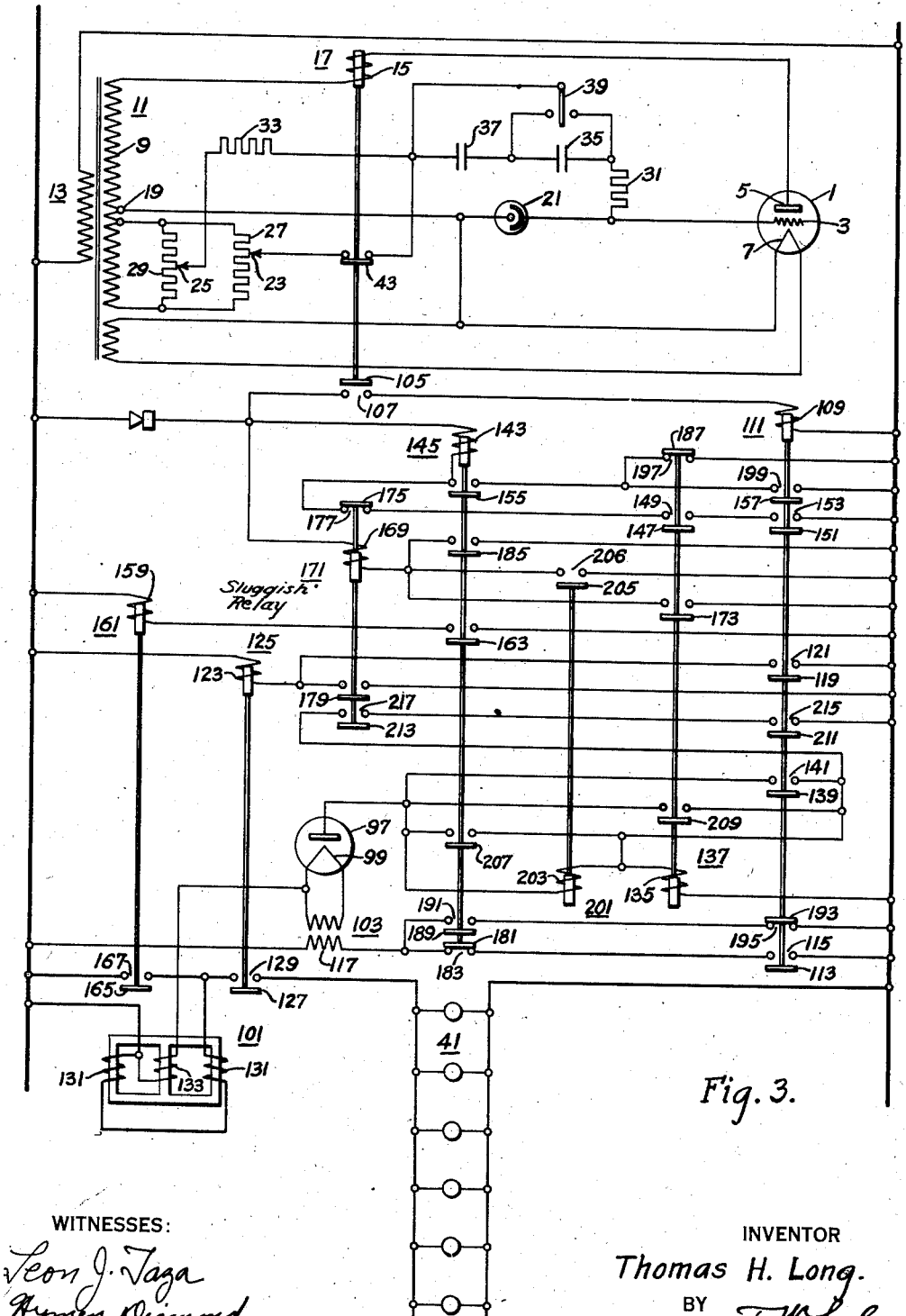

April 27, 1937.  T. H. LONG  2,078,677
LIGHTING CONTROL
Filed Oct. 19, 1932    5 Sheets-Sheet 1
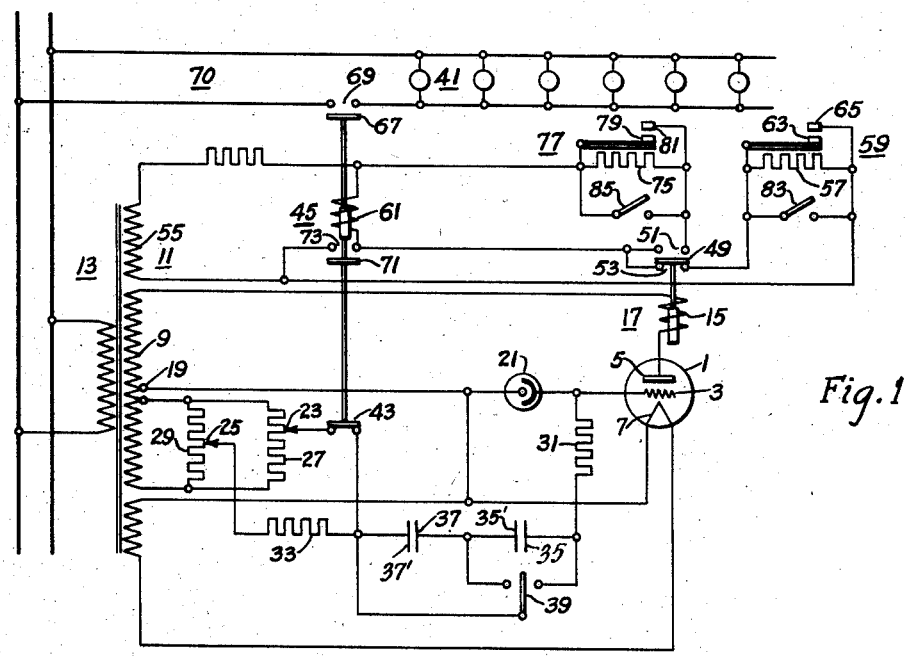
Fig. 1.
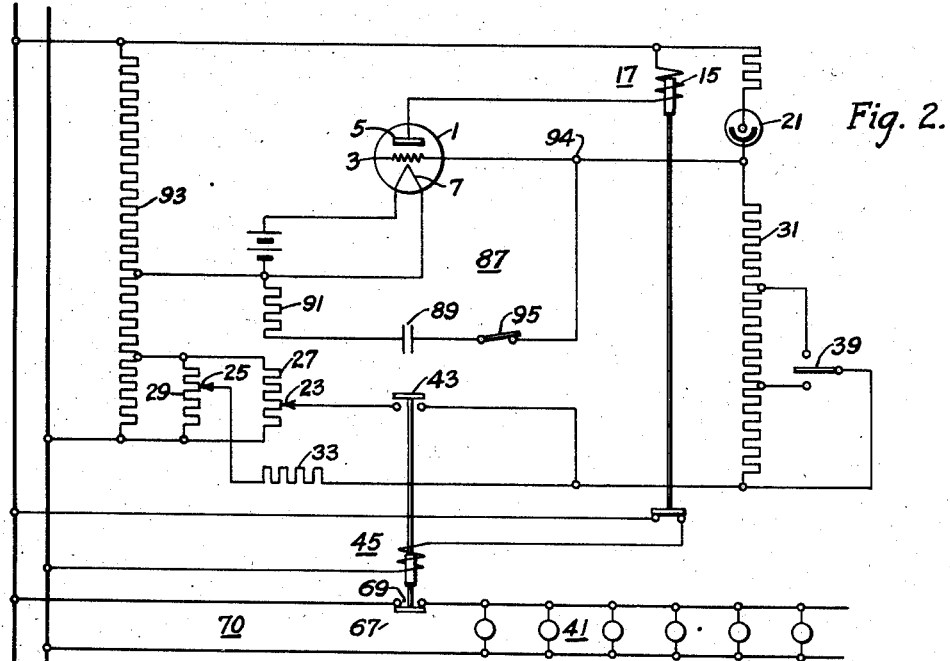
Fig. 2.
Fig. 10.
WITNESSES:
Leon J. Jaza
Hymen Diamond
INVENTOR
Thomas H. Long.
BY F. W. Lyle.
ATTORNEY

Fig. 4.

| Time | Contacts → | 105 | 187 | 155 | 153 | 151 | 175 | 147 | 185 | 173 | 205 | 163 | 119 | 179 | 211 | 213 | 139 | 207 | 209 | 183 | 181 | 193 | 189 | 165 | 121 |
|---|---|---|---|---|---|---|---|---|---|---|---|---|---|---|---|---|---|---|---|---|---|---|---|---|---|
| 1 | Lights off | | O | | | | O | | | | | | | | | | | | | | O | O | | | |
| 2 | Lights Started on | O | O | | | | O | | | | | | | | | | | | | | O | O | | | |
| 3 | | O | O | O | | O | O | | | | | | O | | O | | O | | | O | O | | | | O |
| 4 | Fading in Time | O | O | O | | O | O | | | | | | O | | O | | O | | | O | O | | | | O |
| 5 | | O | | O | | O | O | O | | O | | | O | | O | | O | | O | O | O | | | | O |
| 6 | Full Intensity | O | | O | O | O | | O | O | O | | O | O | O | O | O | O | O | O | O | | | O | O | O |
| 7 | | | O | O | O | O | O | | O | | | O | O | O | O | O | O | O | | O | | | O | O | O |
| 8 | Prepare to fade out | | O | O | O | O | | O | | | | O | O | O | O | O | O | O | | O | | | O | O | O |
| 9 | | | O | | O | | | O | | | | O | | O | | O | | O | | | O | O | O | O | O |
| 10 | Filament heating | | O | | O | | | O | | | | O | | O | | O | | O | | | O | O | O | O | O |
| 11 | | | | O | | O | O | O | | O | | O | | O | | O | O | | | | O | O | O | O | O |
| 12 | | | | | | | O | | O | | | O | | O | | | O | | O | | O | O | | | O |
| 13 | Fading out Time | | | | | | O | | O | | | O | | O | | | O | | O | | O | O | | | O |
| 14 | | O | | | | | | | O | | | O | | O | | | | | | | O | O | | | O |
| 15 | | O | | | | | | | | | | O | | O | | | | | | | O | O | | | O |
| 16 | Lights off | O | | | | O | | | | | | | | | | | | | | | O | O | | | |
| 5a | Same as 14 | O | | | | | | | O | | | O | | O | | | | | | | O | O | | | O |
| 11a | Same as 7 | O | O | O | O | O | | | O | | | O | O | O | O | O | O | | | O | | | O | O | O |
| 14a | | O | | O | | O | | O | | O | | | O | O | O | O | | | O | O | | | | | O |
| 15a | | O | O | O | | O | | | | | | | O | O | O | O | | | O | O | | | | | O |
| 16a | Same as 3 | O | O | O | | O | O | | | | | | O | | O | | O | | | O | O | | | | O |

April 27, 1937.  T. H. LONG  2,078,677
LIGHTING CONTROL
Filed Oct. 19, 1932   5 Sheets-Sheet 4
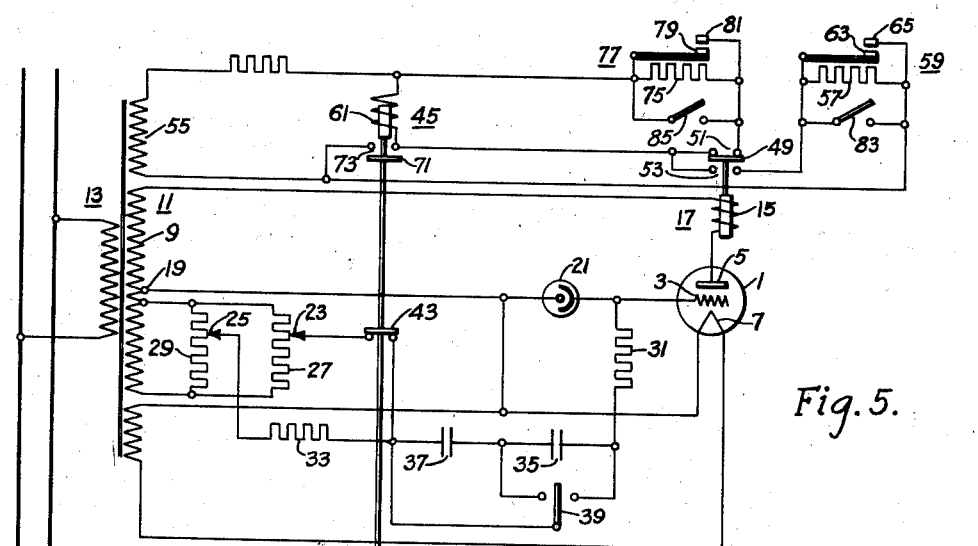
Fig. 5.
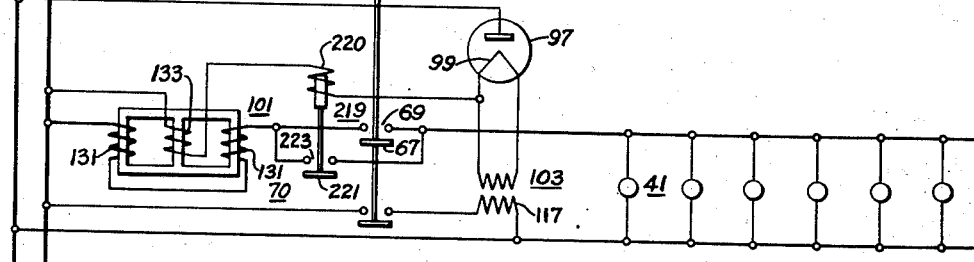
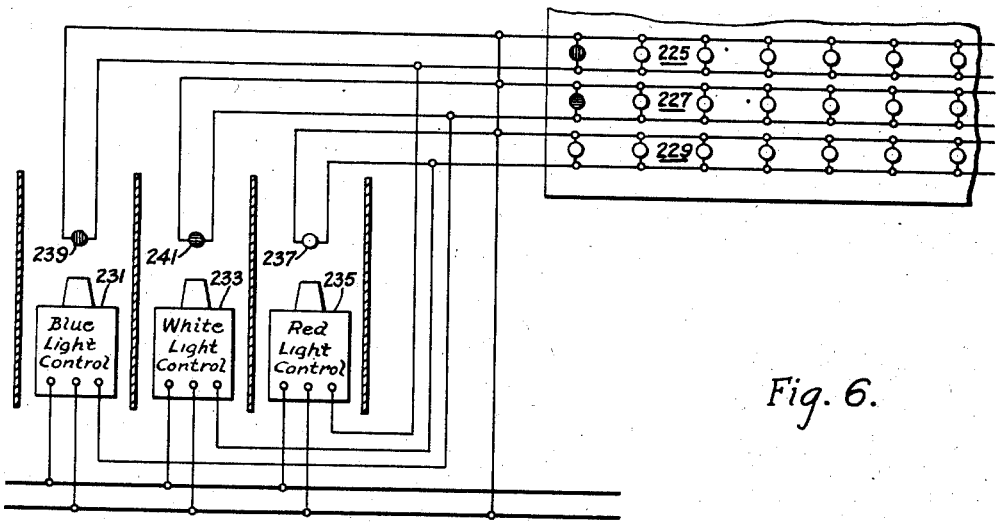
Fig. 6.
WITNESSES:
INVENTOR
Thomas H. Long.
BY
ATTORNEY

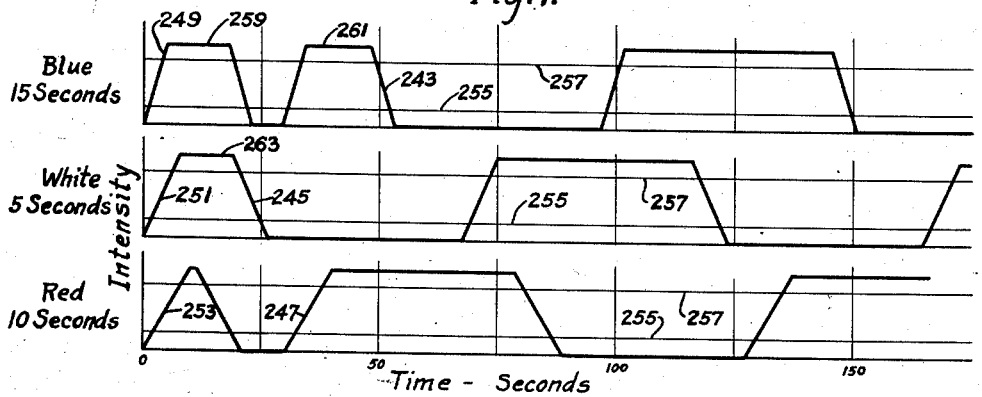
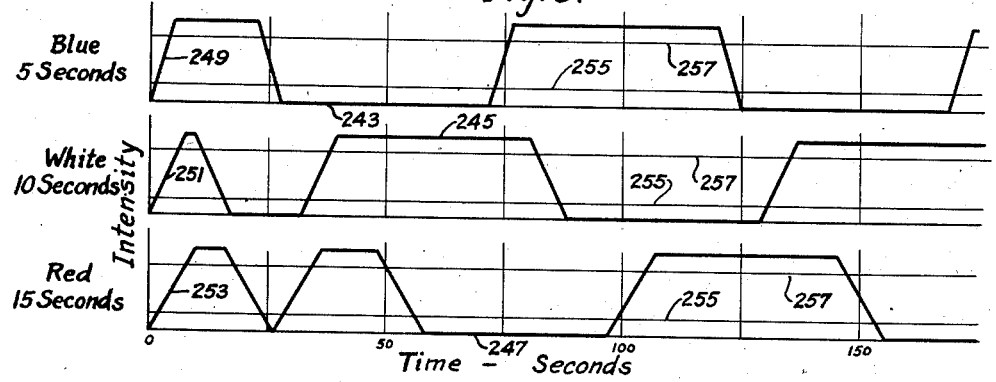
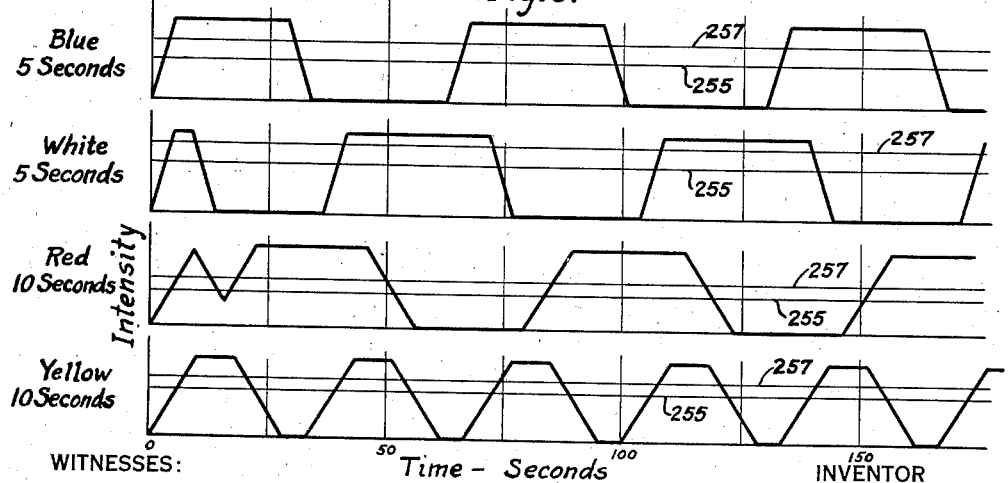

Patented Apr. 27, 1937

2,078,677

UNITED STATES PATENT OFFICE 2,078,677

LIGHTING CONTROL

Thomas H. Long, Irwin, Pa., assignor to Westinghouse Electric & Manufacturing Company, East Pittsburgh, Pa., a corporation of Pennsylvania Application October 19, 1932, Serial No. 638,580

16 Claims. (Cl. 177—346)

My invention relates to control apparatus and it has particular relation to apparatus for controlling the supply of power to illuminating units.

It is an object of my invention to provide a system for so controlling the supply of power to the illumination units of a display device that the illumination units shall be energized when the natural illumination in the region thereof falls to a predetermined minimum intensity, and shall be deenergized and energized periodically thereafter by the effect of the illumination, provided by the display device, on the sensitive elements of the control system.

An additional object of my invention is to provide an automatically controlled illumination system, wherein the illumination shall fade-in when it is turned on and shall fade-out when it is turned off.

An ancillary object of my invention is to provide a system for controlling the supply of power from a power source to a work circuit in such manner that the excitation of the work circuit, when it is energized, is continuously increased from a small value to the maximum value and when the system is deenergized, the supply of power is continuously decreased from the maximum value to the minimum value; in which system the apparatus for providing the continuous effect shall be deenergized after it has performed its function.

An incidental object of my invention is to provide display apparatus comprising a system of groups of illuminating units, the units of each group having the property of emitting distinct colors; in which a dynamic display shall be produced by the sequential excitation of the groups of units, which excitation shall be automatically produced by the interaction of illuminating units of each group and illumination control units provided for the purpose of controlling the excitation of each group.

More concisely stated, it is an object of my invention to provide a simple system for so controlling the supply of power to the illuminating units of a display device or of a shop or workroom that the units shall fade-in when they are energized and fade-out when they are deenergized; and in the case of a display device, a dynamic display of any predetermined character shall be produced by the sequential fading of the illuminating units.

According to my invention the photo-sensitive device of an illumination control system is subjected to the illumination in the region, wherein the illumination units to be controlled are disposed. The output of the illumination control unit which is, in general, the output circuit of an amplifier tube is so coupled to the illumination units through a system of relays and contactors that the proper timing or fading effect is produced.

The novel features that I consider characteristic of my invention are set forth with particularity in the appended claims. The invention itself, however, both as to its organization and its method of operation, together with additional objects and advantages thereof will best be understood from the following description of specific embodiments when read in connection with the accompanying drawings, in which—

Figure 1 is a diagrammatic view showing an embodiment of my invention, in which a dynamic display is produced by energizing and deenergizing the illuminating units of a display device in periodic sequence, Fig. 2 is a diagrammatic view showing a modification of my invention in which the periodic effect is produced by a time constant circuit, Fig. 3 is a diagrammatic view showing another modification of my invention in accordance with which a system of illuminating units fade-in when they are energized and fade-out when they are deenergized, Fig. 4 is a table illustrating the operation of a system such as shown in Fig. 3, Fig. 5 is a diagrammatic view showing a further modification of my invention, in which a system of illuminating units are so controlled that they periodically fade-in, remain in energized condition for a predetermined interval of time, fade-out and remain in deenergized condition for a predetermined interval of time, Fig. 6 is a diagrammatic view showing the essential elements of a dynamic display device, in which a circuit such as is shown in Fig. 5 is applied to produce the display, Figs. 7, 8 and 9 are charts showing graphically the character of display produced by a system such as is shown in Fig. 6; and Fig. 10 is a diagrammatic showing of a modification of the part of the circuit of Fig. 2.

The apparatus shown in Fig. 1 comprises an electric discharge device 1 having a control electrode 3 and a plurality of principal electrodes 5 and 7. The device 1 may be of the high vacuum or gas filled type but is preferably of the high vacuum type. Power is supplied to the electric discharge device 1 from a section 9 of the secondary 11 of a suitable transformer 13, the anode 5 of the device being connected to one terminal of the section 9 through the exciting coil 15 of a relay 17 while the cathode 7 of the device is directly connected to the center tap 19 of the section.

The control electrode 3 of the electric discharge device 1 is connected to an intermediate tap 19 of the section 9 of the secondary 11 through a photo-sensitive device 21 which is subjected to the totality of illumination in the region, the illumination of which is to be controlled. The control electrode 3 is also connected to the movable taps 23 and 25 of a plurality of potentiometers 27 and 29, that are energized from a portion of the secondary section 9, whereby power is supplied to the electric discharge device 1, through a plurality of resistors 31 and 33 and a plurality of capacitors 35 and 37. The sensitivity of the system may be controlled by shunting out either one or both of the capacitors 35 and 37 and a switch 39 is provided for this purpose.

The two potentiometers 27 and 29 coupled to the control electrode 3 of the electric discharge device 1 are provided for the purpose of adjusting the bias of the control electrode to correspond to the conditions under which it is desirable that the system should operate. One of the potentiometers 27 is utilized for the purpose of determining the illuminating flux that should impinge on the photo-sensitive device to cause the system to operate and the illuminating units 41 to be turned on. This potentiometer is generally designated as the turn on potentiometer. Correspondingly, the second potentiometer 29 is provided for the purpose of determining the illumination for which the system is actuated to turn off the artificial illuminating units 41 and is designated as the turn off potentiometer. It is to be noted that the movable tap 23 of the turn-on potentiometer 27 is connected to the control electrode 3 through the movable contact 43 of a relay 45 whereby the artificial illuminating units 41 are energized. When this relay is energized, the movable tap 23 is disconnected from the control electrode 3 and the condition of the electric discharge device 1 is under the control only of the turn-off potentiometer 29.

The illuminating units 41 that are controlled by the system are disposed in a display device of any general character. As long as the natural illumination continues above a certain predetermined value, photo-sensitive device 21 remains a good conductor thereby maintaining the potential of control electrode 3 substantially the same as that of cathode 7 of device 1, thus maintaining continual current flow through relay 17 and keeping contacts 53 continuously open so that no current flows through winding 61 of relay 45. Consequently, contacts 69 remain open and lights 41 remain out. The photo-sensitive device 21 is connected in a circuit which extends from the intermediate tap 19 of the secondary section 9, through the photo-sensitive device, the resistor 31, the capacitors 35 and 37 (when the switch 39 is in a central position) to the movable taps 23 or 25 of the potentiometers 27 or 29, depending upon the condition of the relay 45. The control path of the electric discharge device 1 is connected in a circuit which extends from the intermediate tap 19, to the cathode 7 of the device 1, the control electrode 3, the resistor 31, the capacitors 35 and 37 to the movable taps 23 or 25.

It is seen that the photo-sensitive device 21 is connected in the system in opposite phase relationship to the control path of the electric discharge device 1. When the photo-sensitive device is deenergized therefore, the control electrode 3 is of positive electrical polarity relative to the cathode 7 and a charging current flows between the control electrode 3 and the cathode 7 to charge the capacitors 35 and 37 so that their plates 35 and 37 are negative in potential relative to their plates 35' and 37' respectively. When the polarity of the power supply is reversed, the photo-sensitive device 21 becomes conductive and the control path between the control electrode 3 and the cathode 7 of the electric discharge device 1 becomes non-conductive. The charge accumulated on the capacitors 35 and 37 leaks away through the resistor 31 and the photo-sensitive device at a rate depending on the time constant of the system incorporating the capacitors and their appurtenant impedances and on the state of excitation of the photo-sensitive device. The output of the electric discharge device 1 depends on the mean negative charge on the capacitors and is high when the negative charge is low (i. e., when the photo-sensitive device is highly excited) and low when the charge is high. When the photo-sensitive device 21 is conductive the potential applied to the negative plates of the capacitors by the source is positive relative to the potential applied to the other plates and if the excitation of the photo-sensitive device is high enough the capacitors are not only discharged but are recharged positively.

When the illumination in the region to the influence of which the photo-sensitive device 21 is subjected is high, the output of the electric discharge device is high and the relay 17 is energized. The illuminating units 41 are, therefore, deenergized. When the natural illumination in the region of the display device attains a low value predetermined by the condition of the turn-on potentiometer 27, the output of the electric discharge device 1 is so decreased that the relay 17 associated therewith is deenergized. The movable contact 49 of the relay 17, therefore, disengages a plurality of upper fixed contacts 51 and engages a plurality of lower fixed contacts 53 to close a circuit through another section 55 of the secondary 11 of the power supply transformer 13, the heating coil 57 of a thermal timer 59 and the exciting coil 61 of the relay 45, whereby the activity of the illuminating units 41 is controlled.

By reason of the fact that the heating element 57 of the thermal timer 59 is connected in series with the exciting coil 61 of the relay 45 that controls the condition of the illuminating units 41, the exciting coil of the relay is not energized but the temperature of the heating element is raised. After an interval of time predetermined by the condition of the heating element 57, its temperature is sufficiently raised to actuate its movable contact 63 to engage a corresponding fixed contact 65 short circuiting the heating element 57 and thereby causing sufficient current to be transmitted through the exciting coil 61 of the relay 45, whereby the activity of the illuminating units 41 is controlled, to energize this relay. When the relay 45 is thus energized, its upper movable contact 67 engages a plurality of corresponding fixed contacts 69 to close an energizing circuit 70 through the illuminating units 41 of the display device while its central movable contact 71 engages a plurality of corresponding fixed contacts 73 to lock the exciting coil 61 in its energized condition, while, as has been explained hereinabove, the lower movable contact 43 disconnects the turn-on potentiometer 27 from the system.

The photo-sensitive device 21 is so disposed as to be subjected to the illumination emitted by the units 41 of the display device, and it is now subjected to combined natural and artificial illumination. On the other hand, the turn-off potentiometer 29 is so adjusted that when the photo-sensitive device is subjected to the illumination from the display units 41, the excitation of the electric discharge device 1 is so increased that the relay 17 associated therewith is energized and its movable contact 49 is, in turn, disengaged from the lower fixed contacts 53 and engages the upper fixed contacts 51. A circuit is now closed through the central movable contact 71 of the relay 45 whereby the activity of the illuminating units 41 is controlled through the movable contact 49 of the relay associated with the electric discharge device 1 and through the thermal element 75 of a second timer 77. This circuit shunts the exciting coil 61 of the relay 45 whereby the activity of the illuminating units 41 is controlled but the relay 45 is not deenergized by the effect of the impedance of the thermal element 75 of the timing unit 77 in the shunting circuit. However, when the heating element 75 is raised to a proper temperature, the movable contact 79 associated therewith engages its corresponding fixed contact 81 and the impedance in the shunting circuit is so decreased that the relay 45 becomes deenergized, in turn, deenergizing the illuminating units and in consequence decreasing the excitation of the photo-sensitive device 21 and the electric discharge device 1 and deenergizing the relay 17 associated therewith. The steps set forth hereinabove are then again repeated and the units are thus illuminated and extinguished with a periodicity which is dependent on the constants of the thermal elements 59 and 77.

For the purpose of adjusting the system, it may be desirable to eliminate the thermal elements 59 and 77. A plurality of switches 83 and 85 whereby the heaters of the thermal timing elements are shunted out are provided for this purpose.

When the natural illumination in the region of the photo-sensitive device 21 rises to a sufficiently high value the discharge device and relay 17 are energized and remain energized in spite of the small decrease in the total illumination which takes place when the artificial illumination is turned off. No further cyclic variations occur until the natural illumination is again reduced sufficiently.

In the modification of my invention shown in Fig. 2, certain time delay functions of such as are performed in Fig. 1 by the thermal timers 59 and 77 are effected by a time constant circuit 87, comprising a capacitor 89 and a resistor 91, which is connected between the control electrode 3 and the cathode 7. In this modification of my invention, the system is energized from a direct current power supply source of any suitable character and the potentials are applied to the electric discharge device 1 and the other elements of the system through a potentiometer 93. The photo-sensitive device 21 is connected between the control electrode 3 and the anode 5 of the electric discharge device 1 and is thus connected to the junction point 94 of the control electrode 3 and the time constant circuit 87. When the region of the illuminating units 41 is subjected to illumination of a predetermined low intensity, the capacitor 89 of the timing circuit 87 is so charged by the current flowing between the cathode 7 and the control electrode 3 that the electric discharge device 1 is deenergized. The charge so applied to the capacitor 89 cannot leak off through the photo-sensitive device 21, since the latter device is substantially deenergized by reason of the low illumination which is impinging thereon. The relays 17 and 45 of the system are, therefore, actuated to energize the illuminating units 41.

When the illuminating units 41 are energized, the excitation of the photo-sensitive device 21 is increased and the charge which has been impressed on the capacitor 89 leaks off through the photo-sensitive device 21 at a rate predetermined by the magnitudes of the resistor 91 and the capacitor 89 and the radiant flux impinging on the photo-sensitive device 21. After an interval predetermined by the constant of the circuit 87, the electric discharge device 1 becomes energized and the relay 17 and 45 of the system are actuated in a suitable manner to produce the necesary extinction of the illuminating units 41.

It is interesting to note that the rate at which the charge leaks away from the capacitor 89 is a function of the excitation of the photo-sensitive device 21 and increases as the excitation of the photo-sensitive device increases. Consequently, the period of illumination and extinction of the illuminating units 41 will vary in accordance with the instensity of the natural illumination in the region of the illuminating units. Thus, on a clear day early in the evening when there is still considerable light, the illuminating units will flash with a greater periodicity than they will later in the evening when the natural illumination has fallen to a comparative low value.

During the daytime, of course, the photo-sensitive device 21 in the system shown in Fig. 2 is so highly excited that the capacitor 89 is maintained in a substantially uncharged condition. The output current of the electric discharge device 1 is therefore sufficient to maintain the relay 17 in energized condition. The potentiometers 27 and 29 serve the same purpose in the apparatus shown in Fig. 2 as they do in the Fig. 1 system. The former determines the illumination at which the sources 41 are turned on and the latter the illumination at which they are turned off. In the particular arrangement shown in Fig. 2, the turn on bias is set more negative than the turn off bias. Accordingly, the frequency of the flashing of the lights is higher than it would be if the settings of Fig. 1 were applied to Fig. 2.

It is well to point out, moreover, that in the system of the type shown in Fig. 2 the time delay increases as the resistance 91 is decreased. In a modified circuit of this type which I have found to be rather useful shown in Fig. 10 the resistor 91 is connected between the photo-sensitive device 21 and the junction point 94 of the control electrode 3 and the capacitor 89. The capacitor may then be directly connected to the cathode 7 of the electric discharge device 1. In this system the time delay increases as the magnitude of the resistor 91 increases.

To eliminate the time constant circuit 87 from the system during the adjustment operation a switch 95 is provided.

The modification of my invention of the type that is shown in Fig. 3 comprises in addition to the photo-sensitive illumination control circuit utilized in the other modifications of my invention and described hereinabove, a rectifier 97 preferably of the high vacuum type such as shown in Dushman Patent 1,287,265 which is equipped with a hot cathode 99 and a saturation reactor 101 cooperatively associated therewith. The cathode 99 of the rectifier 97 is energized from a suitable power supply source through a transformer 103.

When the illumination, in the region for which the illuminating units 41 provide artificial light, falls to a sufficiently low intensity, the relay 17 associated with the electric discharge device 1 is deenergized and its lower movable contact 105 engages a plurality of corresponding fixed contacts 107 to close a circuit through an exciting coil 109 of a second relay 111. The lower movable contact 113 of this relay then engages a plurality of corresponding fixed contacts 115 and a circuit is closed through the primary 117 of the transformer 103 whereby power is supplied to the cathode 99 of the rectifier 97. At the same time another movable contact 119 of the same relay 111 engages a plurality of corresponding fixed contacts 121 and a second circuit is closed through the exciting coil 123 of a third relay 125, the movable contact 127 of which engages a plurality of fixed contacts 129 to close a circuit coupling the illuminating units 41 to the power source through the output windings 131 of the reactor 101. The input windings 133 of the reactor 101 are fed through the rectifier 97 and the exciting coil 135 of the fourth relay 137, the circuit being closed by the engagement of a movable contact 139 of the second relay 111 with a plurality of fixed contacts 141.

As the excitation of the cathode 99 of the rectifier 97 is increased, the current transmitted by the rectifier through the input windings 133 of the reactor 101 and through the exciting coil 135 of the fourth relay 137 is increased. The output current of the reactor 101 is, therefore, increased and in consequence thereof the illuminating units 41 are energized at a predetermined rate and fade in.

When contacts 105 reopen in consequence of the increased illumination upon photocell 21, contacts 113 reopen deenergizing transformer 103 and the consequent cooling of cathode 99 slowly decreases the current from rectifier 97 to winding 133. Simultaneously the impedance of windings 131 increases slowly thereby "fading out", i. e., decreasing the intensity of lights 41. Obviously a similar gradual "fade out" results from opening contacts 183 referred to below.

The fourth relay 137 is of such character that it does not become energized until the rectifier 97 attains a predetermined condition of excitation. When this condition is attained, the relay 137 is energized and a circuit is closed through the exciting coil 143 of a fifth relay 145 through a movable contact 147 of the fourth relay 137 which has engaged a plurality of corresponding fixed contacts 149 and through a further movable contact 151 of the second relay 111 which has also engaged a plurality of corresponding fixed contacts 153.

The fifth relay 145 is energized and is locked in its energized condition through one of its own movable contacts 155 and through a movable contact 157 of the second relay 111. In addition the exciting coil 159 of a sixth relay 161 is energized through a movable contact 163 of the fifth relay 145 and its movable contact 165 engages a plurality of fixed contacts 167 to shunt out the output windings 131 of the reactor 101 and to provide for the direct connection between the power source and the illuminating units 41.

Finally, when the fourth relay 137 was energized, the exciting coil 169 of a seventh relay 171 was energized through one of the movable contacts 173 of the relay 137. The upper movable contact 175 of the relay 171 was disengaged from its corresponding fixed contacts 177 but by reason of the sluggishness of this relay this operation did not occur until after the relay 145 had been energized and locked in its energized condition and did not therefore affect the latter relay. By the excitation of the relay 171 the original circuit through which the fifth relay 145 was energized was thus opened. On the other hand, the third relay 125 whereby the reactor 101 was connected to the illuminating units 41 is maintained in energized condition not only through the movable contact 119 of the second relay 111 but also through a movable contact 179 of the seventh relay 171. It is thus possible for the second relay 111 to become deenergized without the occurrence of an interruption in the connection between the power source and the illuminating units 41 since this circuit is maintained closed by the relay 125. The purpose of this feature will be seen hereinafter.

When the fifth relay 145 is energized, its lower movable contact 181 becomes disengaged from its corresponding fixed contacts 183 and the circuit through the primary 117 of the transformer 103 whereby the cathode 99 of the rectifier 97 is energized is opened. The output of the rectifier 97 is, therefore, decreased and it soon attains a value such that the exciting coil 135 of the fourth relay 137 is deenergized. However, the condition of the fourth relay does not effect the seventh relay 171 and its appurtenant elements, since this relay is maintained in energized condition through a movable contact 185 of the fifth relay 145 which is locked in its energized condition not only through the contact 157 of the second relay 111 but also through an upper movable contact 187 of the fourth relay 137. The system is now in a stable condition, the illuminating units 41 having come to their maximum intensity and suitable illumination being now provided for the region.

When the totality of natural and artificial illumination in the region attains a predetermined maximum value, the relay 17 associated with the photo-sensitive device 21 is energized and the second relay 111 is correspondingly deenergized. The primary 117 of the transformer 103 whereby power is supplied to the cathode 99 of the rectifier 97 is now energized through a movable contact 189 of the fifth relay 145 which is in engagement with its corresponding fixed contacts 191, since this relay is energized, and through a movable contact 193 of the second relay 111 which engages corresponding fixed contacts 195 when the latter relay is deenergized. The cathode 99 of the rectifier 97 is thus heated until it attains a suitable condition.

When this condition is attained, the exciting coil 135 of the fourth relay 137 is energized and its upper movable contact 187 is disengaged from its corresponding fixed contacts 197. Since the stick circuit through the fifth relay 145 was maintained closed through the upper movable contact 157 of the second relay 111 and alternately through the upper movable contact 187 of the fourth relay 137, and since these contactors are now disengaged from their corresponding fixed contacts 199 and 197, the fifth relay 145 is deenergized and the movable contact 189 through which the primary 117 of the transformer 103, whereby power is supplied to the cathode 99 of the rectifier 97, was maintained closed, is now disengaged from its corresponding fixed contacts 191 and the circuit is opened.

The exciting coil 159 of the relay 161 whereby the reactor 101 was shunted out, is now also deenergized and its movable contactor 165 being disengaged from its corresponding fixed contacts 187, the shunting circuit is broken and the illuminating units 41 are energized through the output windings 131 of the reactor 101. As the excitation of the cathode 99 of the rectifier 97 decreases, the current transmitted through the illuminating units 41 decreases and the illumination fades out. When the current transmitted through the rectifier 97 attains a low enough value, the exciting coil 135 of the fourth relay 137 becomes sufficiently deenergized to cause the relay to become deenergized.

Since the fifth relay 145 and the fourth relay 137 are deenergized, the seventh relay 171 would also become deenergized unless provisions are made to maintain it in its energized condition. If the seventh relay 171 were deenergized, the third relay 125 would also be deenergized and the output windings 131 of the reactor 101 would be disconnected from the illuminating units 41. Instead of gradually fading out, the illuminating units 41 would then be extinguished as soon as the fourth relay 137 becomes deenergized and thus would be suddenly rather than gradually extinguished.

It is, therefore, important that the seventh relay 171 be maintained energized and for this reason an eighth relay 201 the exciting coil 203 of which is connected in series with the coil 135 of the fourth relay 137 is provided. The exciting coil 203 of the eighth relay 201 is of such character that it is maintained in energized condition by considerably smaller current than is required to maintain the fourth relay 137 in energized condition. It is, therefore, energized when the short circuits across its coil 203 are removed by the decrease in the excitation of the second, fourth and fifth relays 111, 137 and 145, and its movable contact 205 engages a plurality of corresponding fixed contacts 206 to close a circuit through the exciting coil 169 of the seventh relay 171 and to maintain the circuit closed until the output of the rectifier 97 is so reduced that the output of the illuminating units 41 is substantially negligible. The system is now in a stable condition and the illuminating units 41 are deenergized.

It is to be noted that the eighth relay 201 is wound with wire of comparatively high resistance and it is desirable that only the small current necessary to energize it be transmitted through it and not the comparatively large current necessary to energize the relay 137. The exciting coil 203 of the relay 201 is shunted out during the fade-in operation by the contact 139 of relay 111. At the beginning of the fade-out operation when the relay 111 is deenergized the coil 203 is shunted out by the contactor 207 of relay 145 and after relay 145 is deenergized it is shunted out by the contactor 209 of relay 137.

The chart shown in Fig. 4 is a graphic representation of the operation of the various relays in the system shown in Fig. 3. On this chart, the various events which take place as the relays are energized and deenergized, are set down in a vertical column while the relay contactors that are actuated during the events are in a horizontal row. A closed contact is represented by a circle in the square corresponding to the contacts. The sequence in which the events occur on the contactors are closed is given by the numbers in the extreme left-hand column of the chart. The condition of any contactor during any event may be determined by noting whether the rectangle corresponding to the event and contactor has a circle in it or does not have such a circle.

The columns designated 5a, 11a, 14a, 15a and 16a represent the condition of the relay system in several extraordinary cases. The row 5a represents the situation when the initiating relay suddenly becomes deenergized before the illumination units rise to full intensity, that is to say, during the interval between event 4 and event 6. In such a case the system reverts to a condition represented by column 14 and follows this condition until it attains the condition 16.

The row designated 11a represents the condition which occurs when the relay 17 associated with the photo-sensitive system becomes deenergized, while the illuminating units 41 are fading out. In such a case, the system reverts to a condition such as is represented by row 7. Rows 14a, 15a and 16a represent a further transient condition in which the principal relay 17 becomes energized after the fading out has been initiated. This condition occurs after the relay 145 has been deenergized but before the relay 137 has been deenergized. Since the relay 171 is energized the tube 97 would remain energized indefinitely unless some means were provided to deenergize the relay 137 and revert the system to its normal condition. This object is accomplished by the engagement of contactor 211 of relay 111 and contactor 213 of relay 171 with the corresponding fixed contacts 215 and 217 and the consequent shunting out of the coil of relay 137. Thus it is seen that if during the fade-out operation, and after the relay 145 has been deenergized, the relay 111 is energized, the contactor 211 engages the fixed contacts 215 and contactor 213 being already engaged with its fixed contacts 217, the coil 135 of relay 137 is shunted out and the system is reverted to its normal condition as is represented by row 3 of the chart.

It is well to point out that the turn-on potentiometer 27 and the turn-off potentiometer 29 may be so adjusted that the system of the type shown in Fig. 3 responds to magnitudes of illumination that are very near to each other. In such a case, the relay 17 will be actuated as the illuminating units 41 fade-in and out but before these units attain their maximum or minimum intensities. The output of the units at which the actuation occurs will of course be a function of the setting of the potentiometers 27 and 29 and of the natural illumination. It is apparent that while a system so adjusted will hunt continuously when the natural illumination is such that the relay 17 is actuated, (i. e. when some artificial illumination is required), the amplitude of the hunting variation will not be large and its periodicity can be made as low as desired. The illumination provided by such a control system will therefore be substantially constant and the changes will be unperceptible to one working under the illumination.

In a system adjusted as is explained hereinabove certain elements of the apparatus utilized in a complete system such as is shown in Fig. 3 may be eliminated and the system may as a matter of fact assume the form of the system shown in Fig. 5 without the time delay elements 59 and 77.

It is to be noted that in the system described hereinabove which is particularly designed to be utilized for illuminating purposes rather than for display purposes, the fade-in and fade-out control elements are deenergized during normal operation. In Fig. 5, a system is shown which is particularly adapted to be utilized for display devices. In this system the rectifier 97 and the reactor 101 are maintained in energized condition when the illumination units 41 are energized and are deenergized when the illumination units 41 are deenergized. As will be noted, this system incorporates fewer elements than the system shown in Fig. 3.

The system shown in this view incorporates a photo-sensitive responsive system similar to that shown in Fig. 1. However, the movable contactors 23 and 25 of the potentiometers 27 and 29 are so adjusted that the bias on the control electrode 3 of the electric discharge device 5 is not changed when the system is transformed from one condition to the other. The difference in increment of current required to energize the relay when it is unenergized and the decrement of current required to deenergize the relay when it is energized is utilized for the purpose of attaining a difference in turn-on and turn-off conditions. Thus, when the relay 17 associated with the electric discharge device 1 is once energized, a decrease in the current transmitted through its exciting coil 15 to the original value at which the relay 17 was deenergized, will not produce a deenergized condition of the relay. The decrease in current must be considerably greater than this value. In a similar manner, the relay is not simply energized by a slight increase in current over the value at which it drops out.

The operation of the system shown in Fig. 5 should be apparent from an examination of the view. When the illumination impinging on the photo-sensitive device 21 is sufficiently decreased, the relay 17 associated with the electric discharge device 1 is deenergized and a circuit is closed through its lower fixed contacts 53 and through the resistor 57 of the thermal timing element 59. After an interval of time predetermined by the character of the timing element 59, sufficient current is transmitted through the exciting coil 61 of a second relay 45 to energize the relay. A circuit is then closed through the primary 117 of the transformer 103 whereby electrical energy is supplied to the cathode 99 of the rectifier 97 and through the output windings 131 of the reactor 101. As the excitation of the cathode 99 is increased, the illuminating units 41 fade-in. Moreover, when the current output of the rectifier 97 is sufficiently increased, a third relay 219, the coil 220 of which is in series with the rectifier 97 and the input windings 133 of the reactor 101, is energized and its movable contactor 221 engages a plurality of fixed contacts 223 to close an additional circuit through the output windings 131 of the reactor 101.

When the illuminating units have attained full intensity, in the preferred operation of my system, the photo-sensitive device 21 of the control system is so energized that the electric discharge devise 1 becomes sufficiently energized to energize the relay 17. The movable contactor 49 of the relay 17 then engages the upper fixed contacts 51 cooperating therewith and the usual circuit is closed through the resistor 75 of the second thermal timing element 77. After an interval predetermined by the character of the timing element 77, the second relay 45 is deenergized and the primary 117 of the heating circuit of the cathode 99 of the rectifier 97, is opened as is also the initial circuit through the output windings 131 of the reactor 101. However, the second circuit remains closed through the movable contactor 221 of the relay 219 and the illuminating units 41 continue to fade-out until the current through the rectifier 97 is so reduced that the relay 219 is deenergized. The third relay 219 may be of such character that it becomes deenergized only when the current through the rectifier 97 is reduced to a rather low value. Consequently, the illuminating units will gradually fade-out before this condition occurs. It is apparent that the above-described process may be repeated indefinitely as long as the illumination conditions in the region of the photo-sensitive device 21 are proper for operation.

In Fig. 6, the essential elements of a dynamic display sign are shown in detail. The three sets of illuminating units 225, 227 and 229 represented may be and, in general, preferably are of different colors. Thus, in the present case the upper set 225 is red, the central set 227 blue, while the lower set 229 is white. It is to be remembered of course that while the illuminating units of the groups 225, 227 and 229 are in the present embodiment of my invention shown arranged in three horizontal rows, this illustration is symbolical of any desired arrangement. The units may be intermingled in any desired manner and they may, as is often the case, be arranged so as to form the elements of any desirable arrangement of letters or designs.

Three control systems 231, 233 and 235 of the type shown in Fig. 5 are each respectively subjected to the influence of the illumination from the groups 225, 227 and 229 of units and each system controls the operation of one of the groups of units. The control system 235 whereby the condition of the red units 225 is regulated is under the influence of a light source 237 which is energized, together with the white units 229. The system 231 whereby the blue units 227 are controlled is under the influence of a light source 239 energized, together with the red units 225 and the system 233 whereby the white units 229 are controlled is energized by a source 241 energized, together with the blue units 227.

The sources 237, 239 and 241 influencing the control systems 235, 231 and 233 are so adjusted that when they attain a certain condition, the control unit which they influence begins to turn off the corresponding illuminating units and after a predetermined interval of time determined by the character of thermal timers, as shown in Fig. 5, the controlled illuminating units begin to fade-out. Thus, when the natural illumination in the region of the display device falls to a predetermined lower limit, the control systems 231, 233 and 235 are energized and after a predetermined interval of time, all of the units begin to turn on. However, after the white units 229 have attained a predetermined condition of excitation, the red control system 235 is actuated and the units of the group 225 begin to turn off. The same interaction occurs between the control systems 231 and 233 for the blue and white units 227 and 229 and the controlling sources 239 and 241 which are energized, together with the red and blue units, respectively. If the thermal timers of the control systems 225, 227 and 229 are properly adjusted, any desirable display may be attained.

In Figs. 7, 8 and 9, the display charts for several systems are plotted. The time function is plotted as abscissa and the intensity of the display is plotted as ordinate. In Fig. 7, the upper curve 243 represents the display of a group 227 of blue units, the central curve 245, the display of a group 229 of white units and the lower curve 247 the display of a group 225 of red units. As is indicated in the left-hand margin, the time delays of the controlling elements of the three sets of units are 15, 5 and 10 seconds, respectively and accordingly the blue group of units 227 does not reach its maximum intensity and does not decrease to zero from its maximum intensity until 15 seconds after the corresponding control system 231 has been actuated, the white units 229 require 5 seconds for the same operations while the red units 225 require 10 seconds for these operations.

The slopes of the initial lines 249, 251 and 253 represent the fade-in time. The lower horizontal lines 255 drawn across each set of curves 243, 245 and 247 above the abscissa represent the point of illumination below which the control system 233, 231 or 235 respectively under the influence of the light source 241, 239 or 237 which becomes energized, together with the units 227, 225 or 229, begins to turn-on and the upper horizontal lines 257 represent the point above which the same control system begins to turn off. The two lines 255 and 257 may be designated as turn-on line and turn-off line respectively.

When the natural illumination in the region of a system such as is represented by Fig. 7 attains a low enough value, (that is to say falls below the level of illumination represented by the lines 255), the three groups 225, 227 and 229 of units begin to turn on. When the intensity of illumination emitted by the groups 225, 227 and 229 of units rises above the level represented by the lines 257 the control systems 231, 233 and 235 under the influence of the sources 239, 241 and 237 energized together with the units are actuated and the corresponding units begin to turn off.

In the system represented by Fig. 7, the source 241 associated with the blue units 227 controls the white group 229 of units. Consequently, when the blue units 227 rise to an intensity above the turn-off line 257, the relay system associated with the white units 229 is actuated to begin the turn-off operation. Fifteen seconds after the blue units 227 have been energized to an intensity above the turn-off line 257, the white units 229 actually begin to fade out. Correspondingly, the source associated with the white units 229 controls the system 235 whereby the activity of the red units 225 is regulated. Five seconds after the white units 229 have risen to an intensity above the turn-off point 257, therefore, the red units 225 begin to fade-out. Similarly, the source associated with the red units 225 controls the blue units 227 and ten seconds after the red units have risen above the turn-off intensity, the blue units 227 begin to turn off.

Again, when the blue units 227 begin to turn off, they fade-out until their intensity falls below the turn-on line 255, at which point the control system 233 for white units 229 is actuated. However, the control system 233 does not effectively operate until fifteen seconds after it has been actuated and in the meantime, as can be seen from the chart, the intensity of the blue units 227 falls to its lowest point and rises above the turn-off line 257. Since these events all occur in an interval of less than fifteen seconds, the control system 233 for the white units 229 does not progress to such a point of activity as to effect the condition of the white units. This situation is graphically represented by the curves to 243 and 235 of Fig. 7. Note that the curve 243 has two peaks 259 and 261 while the curve 245 has only one peak 263 and does not rise after it attains its minimum point for a considerable interval of time during which the blue units 227 have twice passed through the turn-on and turn-off intensities.

As can be further seen from Fig. 7, when the intensity of the white units 229 falls below the turn-on line 255, the control system for the red units 225 is actuated and five seconds later the red units 225 begin to fade-in. As has been explained hereinabove, since the red units 225 have fallen below the turn-on intensity, the blue units 227 are energized to a condition above the turn-off point in an interval of less than fifteen seconds and the white units 229 remain unaffected by the change which has occurred.

The process explained hereinabove is automatically repeated and, as can be seen from the chart, the system eventually reverts to a condition in which the illuminating units 225, 227 and 229 will turn on and off in a predetermined cyclic sequence. In Fig. 8, a similar chart involving different time periods is shown, and in Fig. 9 the chart represents a system incorporating four different groups of illuminating units. These units may be of four different colors, if such a procedure is desirable.

It is to be noted that the red illumination in Fig. 9 rises more slowly than the blue or white. Accordingly, since the white illumination rises rapidly, the turn-off apparatus for the red is actuated by the white illumination at a comparatively low point in the line representing the first rise. Five seconds later the turning off of red illumination begins. This occurs before the red illumination reaches its maximum value and, therefore, there is a peak in the curve representing the changing illumination. The succeeding peak which points downward is produced in the same manner.

Although I have shown and described certain specific embodiments of my invention, I am fully aware that many modifications thereof are possible. My invention, therefore, is not to be restricted, except insofar as is necessitated by the prior art and by the spirit of the appended claims.

Certain subject matter herein disclosed is claimed in my copending application Serial No. 619,955.

I claim as my invention:

1. A control system for a display device of the type incorporating one or more illuminating units comprising means to respond to the totality of natural and artificial illumination, inclusive of that due to said units, in the region of said illuminating units and to be actuated when said illumination, with said units deenergized, is at an intensity smaller than a predetermined value, means, to be controlled by said illumination-responsive means, when it is actuated for energizing said illuminating units a predetermined interval of time after said totality of illumination is below said value and means to be controlled by said energizing means and by said illumination, with said units energized, for deenergizing said illuminating units a predetermined interval of time after said units have been energized provided said totality of illumination remains at an intensity above another predetermined value which is above said predetermined value.

2. A control system for a display device of the type incorporating one or more illuminating units comprising means, to respond to the totality of natural and artificial illumination, inclusive of that due to said units, in the region of said illuminating units, to be actuated in one sense when said illumination, with said units deenergized, has an intensity smaller than a predetermined intensity and to be actuated in another sense when said illumination, with said units energized, has an intensity greater than a predetermined intensity, means to be actuated by said illumination-responsive means as it is actuated in one sense and the other for energizing and deenergizing said illuminating units for periods of time and means for timing said periods.

3. A control system for a display device of the type incorporating one or more illuminating units comprising means for energizing said illuminating units and means, including an electric discharge device having a control electrode and a plurality of principal electrodes, a photo-sensitive device, to be subjected to the totality of natural and artificial illumination, inclusive of the illumination from said units, in the region of said illuminating units, coupled between the control electrode and a principal electrode of said electric discharge device and means so coupled to said control electrode and said photosensitive device that the resultant potential impressed on the control electrode follows with substantial time lag changes in the state of excitation of said photo-sensitive device, for actuating said energizing means to periodically energize and deenergize said illuminating units, the connections between the electrodes of said discharge device and said photo-sensitive device being such that the last said means actuates said energizing means only when the illumination with said units deenergized has an intensity smaller than a predetermined intensity.

4. A control system for a display device of the type incorporating one or more illuminating units comprising means for energizing said illuminating units, an electric discharge device having a control electrode and a plurality of principal electrodes, a photo-sensitive device, to be subjected to the totality of natural and artificial illumination including the illumination from said units in the region of said illuminating units, coupled between the control electrode and a principal electrode of said electric discharge device, a circuit having a predetermined substantial time constant coupled between the control electrode and another principal electrode of said electric discharge device and cooperatively associated with said photo-sensitive device for controlling the operation of said discharge device, means responsive to the operation of said discharge device for actuating said energizing means to periodically energize and deenergize said illuminating units for periods which are functions of the time constant of said circuit and means in circuit with said discharge device for preventing the operation of said responsive means when the said illumination with the units deenergized has an intensity greater than a predetermined intensity.

5. A control system for a display device of the type incorporating one or more illuminating units comprising means for energizing said illuminating units, an electric discharge device having a cathode, an anode and a control electrode, a photo-sensitive device to be subjected to the totality of natural and artificial illumination including the illumination from said units in the region of said illuminating units, coupled between said anode and said control electrode, a circuit comprising a capacitor and a resistor coupled between said control electrode and said cathode and cooperatively associated with said photo-sensitive device for controlling the operation of said discharge device, means responsive to the operation of said discharge device for actuating said energizing means to periodically energize and deenergize said illuminating units for periods that are functions of the magnitudes of said capacitor and said resistor and means in circuit with said discharge device for preventing the operation of said responsive means when said illumination has a value greater than a predetermined value.

6. In a system for controlling the total illumination within a region subject to natural and artificial illumination, means to respond only to the natural illumination in said region when its intensity is below a predetermined intensity to gradually increase the excitation of the artificial illumination for said region until it attains a predetermined condition of excitation and means to respond to the totality of natural and artificial illumination in said region when said totality of illumination has an intensity greater than a predetermined intensity greater than said first-named predetermined intensity by a predetermined amount to gradually decrease the excitation of said artificial illumination until it attains a predetermined minimum value.

7. A system for controlling the supply of power from a power source to the artificial illuminating units in a region comprising a reactor having input and output windings, means for coupling said output windings to said power source and to said illuminating units, an asymmetric electric discharge device of the type having an excitable cathode, means for coupling said device to said power source and to the input windings of said reactor, means for gradually increasing the excitation of said cathode thereby to gradually increase the power fed to the input windings of said reactor and to gradually increase the power output of said reactor, means to respond to the natural illumination in said region when its intensity is below a predetermined intensity for actuating said coupling means between said output windings and said illuminating units to couple said illuminating units to said source through said windings, and to respond to the natural illumination in said region, when it has the last said intensity, for actuating said excitation-increasing means to gradually increase the power supplied to said illuminating units, means for deenergizing said reactor and means to deenergize said electric discharge device after said illuminating units have been energized to a predetermined condition.

8. A display device comprising a plurality of sets of illuminating units each manifesting a different visual characteristic and means for controlling the illumination of each set of said units responsive to the illumination emitted by another set of said units.

9. Apparatus according to claim 8 characterized by the fact that each set of illuminating units emits illumination of a different color.

10. Apparatus according to claim 8 characterized by the fact that the controlling means is of a type that causes each set of units when dark to gradually rise in illuminating intensity at an instant dependent on the illumination emitted by another set of units, to remain energized at a predetermined intensity for an interval of time depending on the the illumination of said other unit and to gradually fall in illuminating intensity at an instant dependent on the illumination emitted by the said other unit.

11. In a system for controlling the application of power from a power source to a work circuit, means for coupling said power source to said work circuit; means for uncoupling said power source from said work circuit, means cooperating with said coupling and uncoupling means and including a reactor having output windings and input windings, an asymmetric electric discharge device of the type having an excitable cathode coupled to said input windings and means for gradually raising the state of excitation of said excitable cathode to a predetermined maximum value, for gradually increasing the power applied to said work circuit when said coupling means is active to couple said power source to said work circuit and for gradually decreasing the state of excitation of said excitable cathode to a predetermined minimum value for gradually decreasing the power supplied to said work circuit when said uncoupling means is active to uncouple said power source therefrom; said uncoupling means including a plurality of relays so coupled to said electric discharge device that one of said relays is effective only when the power transmitted by said electric discharge device is greater than a predetermined minimum value while another of said relays is effective only when the power transmitted by said electric discharge device is smaller than said minimum value, means, operative when said one relay is effective, to couple said output windings serially between said power source and said work circuit and means operative, when said other relay is effective, to continue said serial coupling and then interrupt current flow from said power source through said output windings.

12. In combination, a power source, illuminating means providing illumination for a region, means when operative for directly coupling said power source to said illuminating means, a reactor having input and output windings, means when active for coupling said power source to said illuminating means through said output windings, means, including an asymmetric electric discharge device of the type having an excitable cathode and means when operative for varying the condition of excitation of said cathode for energizing the input windings of said reactor thereby to energize the output windings and to vary the power output of said reactor, means, to respond to the total natural and artificial illumination including that of the illuminating means itself in the region of said illuminating means when said illuminating means is energized for energizing said excitation-varying means to increase the excitation of said cathode when the total illumination in said region attains a value greater than a predetermined value, means for simultaneously rendering inoperative said excitation-varying means and said direct-coupling means when said cathode has attained a predetermined condition of excitation and to render active said third means to couple said source to said illuminating means through the output windings of said reactor, and to vary the output of said illuminating means in accordance with the output of said electric discharge device as it decreases by reason of the rendering inoperative of said excitation varying means and means for rendering inactive said coupling means between the output windings of said reactor and said illuminating means after said illuminating means has attained a deenergized condition.

13. A system for controlling the power applied from a power source to illuminating means for a region comprising means energized to respond to a predetermined amount of the total illumination in the region for increasing the coupling of said power supply source to said illuminating means and to another predetermined amount of such illumination for decreasing said coupling, means when energized cooperating with said coupling means for causing the increase of the power applied to said illuminating means when said coupling is increased to be gradual and for causing the decrease of the power applied to said illuminating means when said coupling is decreased to be gradual and means for deenergizing said cooperating means without changing the amount of the then total illumination after the power delivered to said illuminating means has attained one of said predetermined amounts and after it has attained the other of said predetermined amounts and during the interim during which said coupling means is being changed from increased to decreased coupling or vice versa.

14. In combination, a discharge device, a circuit therethrough, means for gradually varying the discharge current of said discharge device through said circuit, circuit-closing-and-opening means to be energized by the current output of said discharge device and when effective to maintain said circuit closed, the last said means being effective as long as the discharge current of said discharge device is above a predetermined value, additional circuit-closing-and-opening means when effective, to maintain said circuit closed, the last said means being effective when the energizing current is below said predetermined value and above a second value of small magnitude compared to the maximum current output of said discharge device, and means to be actuated by said first-mentioned circuit-closing-and-opening means when ineffective to maintain said circuit closed, providing for the transmission of the discharge current of said discharge device to said additional circuit-closing-and-opening means.

15. In combination with an electric power supply and a work circuit, an impedance having a control winding, the terminal voltage of said impedance varying in response to changes in the magnitude of current in said control winding, an electrical discharge tube having a filament electrode which is electrically heated and which has an appreciable thermal lag whereby the current therethrough is dependent upon said lag, means to connect said discharge tube to supply current through said control winding and including a series switch, a circuit connecting said power supply to said work circuit through said impedance and also including a switch, means to close said switches, and means to insure that the last said switch is closed not later than the first said switch.

16. In combinaion with an electric power supply and a work circuit, an impedance having a control winding, the terminal voltage of said impedance varying in response to changes in the magnitude of current in said control winding, an electrical discharge tube having a filament electrode which is electrically heated and which has an appreciable thermal lag whereby the current therethrough is dependent upon said lag, means to connect said discharge tube to supply current through said control winding, a circuit connecting said power supply to said work circuit through said impedance and including a switch, a heating circuit for said filament and also including a switch, means for opening said switches, and means to insure that the first said switch is opened substantially later than the last said switch.

THOMAS H. LONG.